US006364298B1

(12) United States Patent
Vossel et al.

(10) Patent No.: US 6,364,298 B1
(45) Date of Patent: Apr. 2, 2002

(54) RUBBER BEARING WITH RADIAL TRAVEL LIMITATION AND DAMPING AGENT CHANNEL

(75) Inventors: Andreas Vossel, Osnabrück; Frank Meyerink, Lohne; Joachim Hünecke, Damme, all of (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/743,001
(22) PCT Filed: Apr. 27, 2000
(86) PCT No.: PCT/DE00/01307
 § 371 Date: Mar. 7, 2001
 § 102(e) Date: Mar. 7, 2001
(87) PCT Pub. No.: WO00/66910
 PCT Pub. Date: Nov. 9, 2000

(30) Foreign Application Priority Data

Apr. 30, 1999 (DE) .......................................... 199 19 863

(51) Int. Cl.$^7$ .............................................. B60G 11/22
(52) U.S. Cl. .................... 267/293; 267/140.12; 267/152
(58) Field of Search ........................... 267/293, 140.11, 267/140.12, 140.13, 152, 153, 141, 141.2, 219; 248/562, 636, 638

(56) References Cited

U.S. PATENT DOCUMENTS

| 4,702,346 A | * | 10/1987 | Uno et al. ............. 267/140.11 |
| 5,178,375 A | * | 1/1993 | Hamaekers et al. ... 267/140.12 |
| 5,286,011 A | * | 2/1994 | Strand .................... 267/140.12 |
| 5,397,112 A | * | 3/1995 | Roth et al. ............. 267/140.12 |
| 5,413,319 A |   | 5/1995 | Hein et al. |
| 5,492,310 A | * | 2/1996 | Bungart et al. ........ 267/140.12 |
| 5,496,018 A | * | 3/1996 | McLelland et al. .... 267/140.12 |
| 5,702,094 A | * | 12/1997 | McLelland et al. .... 267/140.12 |

FOREIGN PATENT DOCUMENTS

| DE | 36 17 787 A1 | 11/1986 |
| DE | 3930644 | 3/1991 |
| DE | 19729290 | 4/1998 |
| EP | 0418718 | 3/1991 |
| EP | 0656487 | 6/1995 |

* cited by examiner

Primary Examiner—Pam Rodriguez
(74) Attorney, Agent, or Firm—McGlew and Tuttle, P.C.

(57) ABSTRACT

A rubber bearing with radical travel limitation and with a damping agent channel has an inner part with a tubular inner contour, an elastomer surrounding the inner part and connected thereto by vulcanization, and a channel carrier. The channel carrier is made of one or more plastic parts and surrounds the elastomer in some sections and is supported on the elastomer via support elements. Stop surfaces for the radial travel limitation are provided on the inside of the channel carrier. At least one damping agent channel, which connects chambers formed between the elastomer and the channel carrier for receiving a liquid damping agent, is integrated in the outer surface of the channel carrier. In the area of the chambers (7), the channel carrier (3) has recesses (9) for the discharge and the entry of damping agent. The recesses (9), connected to one another by the damping agent channel (10), are arranged on the circumference of the channel carrier (3) in the area of the support elements (8) and opposite the same. Depressions (5), for enclosing damping agent during the coming into contact of the elastomer (2) with the corresponding stop surface (4) as a consequence of an inward deflection of the bearing brought about by a radially introduced force, are provided on the inner contour of the channel carrier (3) and/or on the outer contour of the elastomer (2) in the area of the stop surfaces (4).

12 Claims, 6 Drawing Sheets

RUBBER BEARING WITH RADIAL TRAVEL LIMITATION AND DAMPING AGENT CHANNEL

FIELD OF THE INVENTION

The present invention pertains to a rubber bearing with radial travel limitation and at least one damping agent channel, which comprises an inner part and a tubular inner contour, an elastomer, which is connected to the inner part and is connected thereto by vulcanization, and a channel carrier, which is formed from one or more plastic parts. In addition, a cage consisting of a casting or sheet metal is vulcanized into the elastomer.

BACKGROUND OF TEE INVENTION

Rubber bearings of various designs are frequently used especially in automobile manufacture. Depending on the intended use, greatly different requirements are imposed on the damping properties of the bearings. In some cases, the bearings are designed such that they make possible a hydraulic damping of forces introduced radially, due to the material properties of the elastomer, besides the damping. This is guaranteed by the elastomer being vulcanized with the inner part being surrounded by a ring-shaped element, which is made, in general, from plastic, and by chambers being formed between the parts for receiving a liquid damping agent and due to the shaping of the outer contour of the elastomer and of the inner contour of this element or of a sleeve pushed over the elastomer during the assembly. As is also known for other systems based on hydraulic damping, the damping is achieved by the displacement of the damping agent present in the chambers. It is necessary for this for the chamber to be connected by a channel, which makes it possible for the damping agent to move from one chamber into the other depending on the load on the bearing. Various procedures have become known for preparing the damping agent channels. One possibility is to prepare the damping agent channel in the elastomer. However, it is more advantageous and more customary to surround the elastomer with a plastic element, which forms stop surfaces for a travel limitation at the same time and is further used, in addition, as a channel carrier. The channel is formed by a groove recessed in the channel carrier, generally between the channel carrier and an outer sleeve of the bearing.

Such a bearing has been known from DE 36 17 787. In the solution described in this document, the elastomer is surrounded by a two-part element used as a channel carrier, wherein the channel is formed in the outer circumferential surface of the channel carrier. Another example is given in DE 197 29 290. The fact that the element arranged around the elastomer for the channel is designed as a two-part element in the above-mentioned solution (DE 36 17 787) is considered to be disadvantageous in this document. To make it possible to mount the element, it has an opening and does not surround the elastomer completely. It can be determined from the document that the internal diameter of this opening is greater than the diameter of the inner part connected to the elastomer. As a result, the length of the channel is shorter than in the solution according to DE 36 17 787, which may be disadvantageous especially with respect to a possibly desirable mass damping, which is brought about by the quenching effect caused by the mass of a damping liquid swinging to and from.

SUMMARY AND OBJECTS OF THE INVENTION

The object of the present invention is to provide a rubber bearing with radial travel limitation and a damping agent channel, in which the length of the damping agent channel provided by means of a channel carrier can be made variable to achieve different damping properties, while the channel carrier can be mounted easily at the same time.

According to the invention, the bearing has an inner tube, to which an elastomer is connected by vulcanization. The elastomer is surrounded by the channel carrier, which comprises one or more plastic parts and is supported on the elastomer by means of support elements. The damping agent channel integrated in the outer surface of the channel carrier connects the chambers for the damping agent, which are provided between the elastomer and the channel carrier. According to the present invention, the channel carrier has recesses in the area of the chambers for the discharge or the entry of damping agent, which, connected to one another by the damping agent channel, are arranged on the circumference of the channel carrier, in the area of the support elements and opposite these. At the same time, the channel carrier on its inner contour and/or the elastomer on its outer contour has a depression in the area of the stop surfaces for the radial travel limitation for enclosing damping agent during the coming into contact of the elastomer with the corresponding stop surface as a consequence of an inward deflection of the bearing brought about by a force introduced radially.

According to one embodiment of the present invention, a hole for allowing damping agent to escape is provided in the channel carrier in the area of the depressions formed in the stop surfaces. Due to the arrangement of the recesses and optionally of the holes, the circulation of the damping agent between the chambers, but also within a chamber is made possible. In addition, the holes in the depressions of the stop surfaces for the radial travel limitation make possible the circulation of the damping liquid enclosed there under the effect of a corresponding force.

In one embodiment of the present invention, the damping agent channel arranged in the outer surface of the channel carrier is extended beyond the recesses provided in the area of the chambers. As a result, damping due to the quenching effect of the mass of the liquid (so-called mass damping) is achieved, besides the viscous damping brought about by the circulation of the damping agent between the chambers. The holes in the depressions of the stop surfaces are arranged in this extension of the channel. The damping agent can also circulate within one chamber through such a hole and the recess in the channel carrier, which recess is adjacent to it and borders on the stop surface.

Another advantageous variant pertains to the provision of additional channels for the damping agent, which extend at right angles to the damping agent channel which connects the recesses and extends concentrically around the axis of the bearing, wherein the holes in the depressions of the radial stops are arranged in these additional channels. If the circular channel is additionally extended over the recesses in the channel carrier, corresponding to the embodiment explained above, the circular channels and the channels which cross them and extend in the axial direction intersect one another in one of the holes provided in the depressions of the axial stops.

According to another advantageous embodiment of the bearing according to the present invention, a lip, which acts as a valve for the damping agent moving in the damping agent channel, is made convexly or concavely in one piece with the elastomer in the area of the support elements. The mobility of the lip or the opening behavior of the valve and thus ultimately the damping behavior of the bearing are determined by the geometric design of the support elements.

As was emphasized above, the channel carrier may have a one-part or multi part design. A one-part design can also be considered to be advantageous in the sense of the present invention, in which the channel carrier surrounds the elastomer over an angle of about 300°. The recesses provided in the channel carrier opposite the support elements are designed as perforations in this case.

In another possible design, the channel carrier is made from two plastic parts, which are shaped such that they are fixed in their position due to their shape. However, it is also possible to bring about the fixation of two plastic parts forming the channel carrier by a pin.

In another possible design, the channel carrier comprises two plastic parts, which are connected to one another by means of a hinge. The bearing according to the present invention is characterized, especially concerning the design of the channel carrier, by the fact that the channel carrier can be mounted easily and the length of the channel can be easily varied corresponding to the required damping behavior, maintaining the basic shape of the channel carrier.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
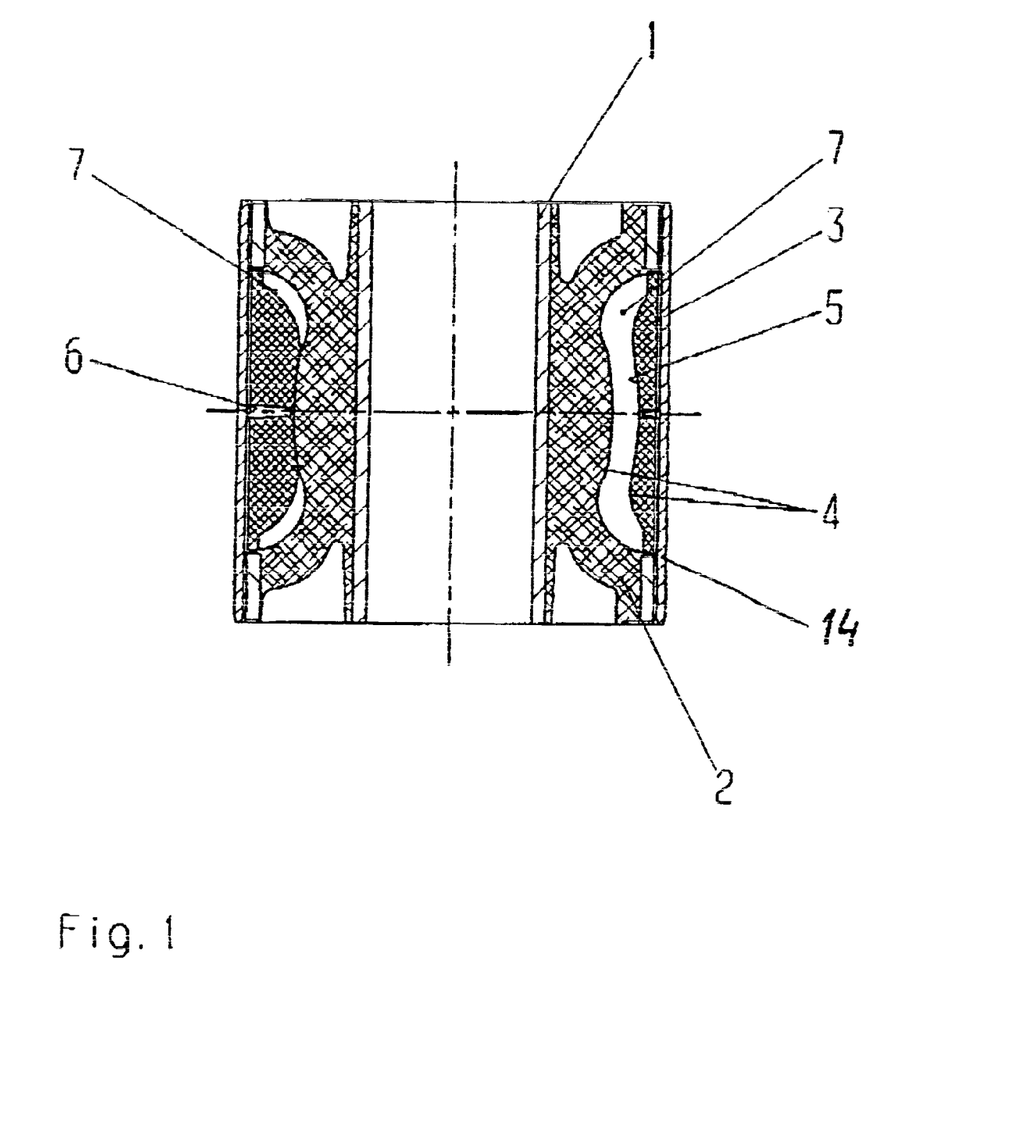
FIG. 1 is an axial sectional view through the bearing according to the present invention.

Referring to the drawings in particular, FIG. 1 shows the general design of the bearing in a sectional view, in which the section extends in parallel to the axis of the bearing. The tubular inner part 1 is surrounded by the elastomer 2, which is connected to the inner part 1 by vulcanization. The channel carrier 3 is arranged around the elastomer 2. The entire structure is accommodated in an outer sleeve 14. As can be recognized, the channel carrier 3 has a depression 5 in the area of the stop surface 4. Damping agent can be enclosed between the channel carrier 3 with the stop surface 4 and the stop surface 4 of the elastomer 2 during the inward deflection of the bearing as a consequence of a radially acting force. The radial travel is limited as a result and a damping effect is achieved at the same time. A hole 6, through which the damping agent can escape during further inward deflection and consequently increasing pressure into the damping agent channel 10 arranged circularly around the axis of the bearing and into the transverse channel 11, which is likewise present in the exemplary embodiment, is provided in the area of the stop surface 4 of the channel carrier 3, which stop surface is provided with the depression 5.

Figure 2:
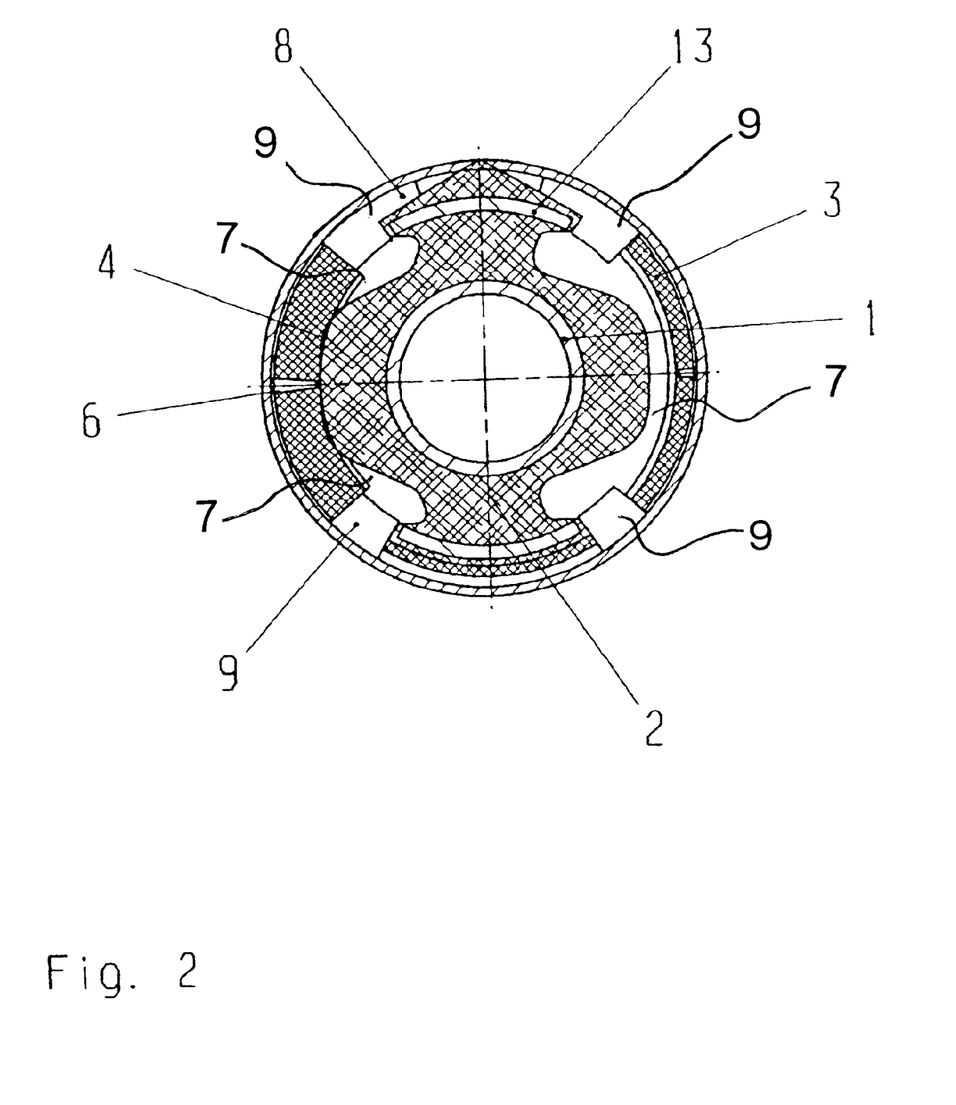
FIG. 2 is a radial sectional view of the bearing according to FIG. 1.

The design of the same bearing is shown once again in FIG. 2 in the view of a section extending radially through the bearing. It is seen here that besides the recesses 9 formed by the shaping of the support elements 8, the channel carrier 3 has additional recesses 9, which are arranged opposite the support elements 8 and are likewise connected to the damping agent channel 10 and make possible the circulation of the damping agent between the chambers 7. To make possible the supporting of the channel carrier 3 on the elastomer 2, a cage 13 is vulcanized into this channel carrier 3 in the area of the support elements 8, as in their opposite side. For example, casting or sheet metal is used in the known manner as the material of the cage. The stop surfaces 4 for the radial travel limitation with the holes 6 arranged therein for the escape of the damping agent are also clearly recognizable.

Figures 3A, 3B:
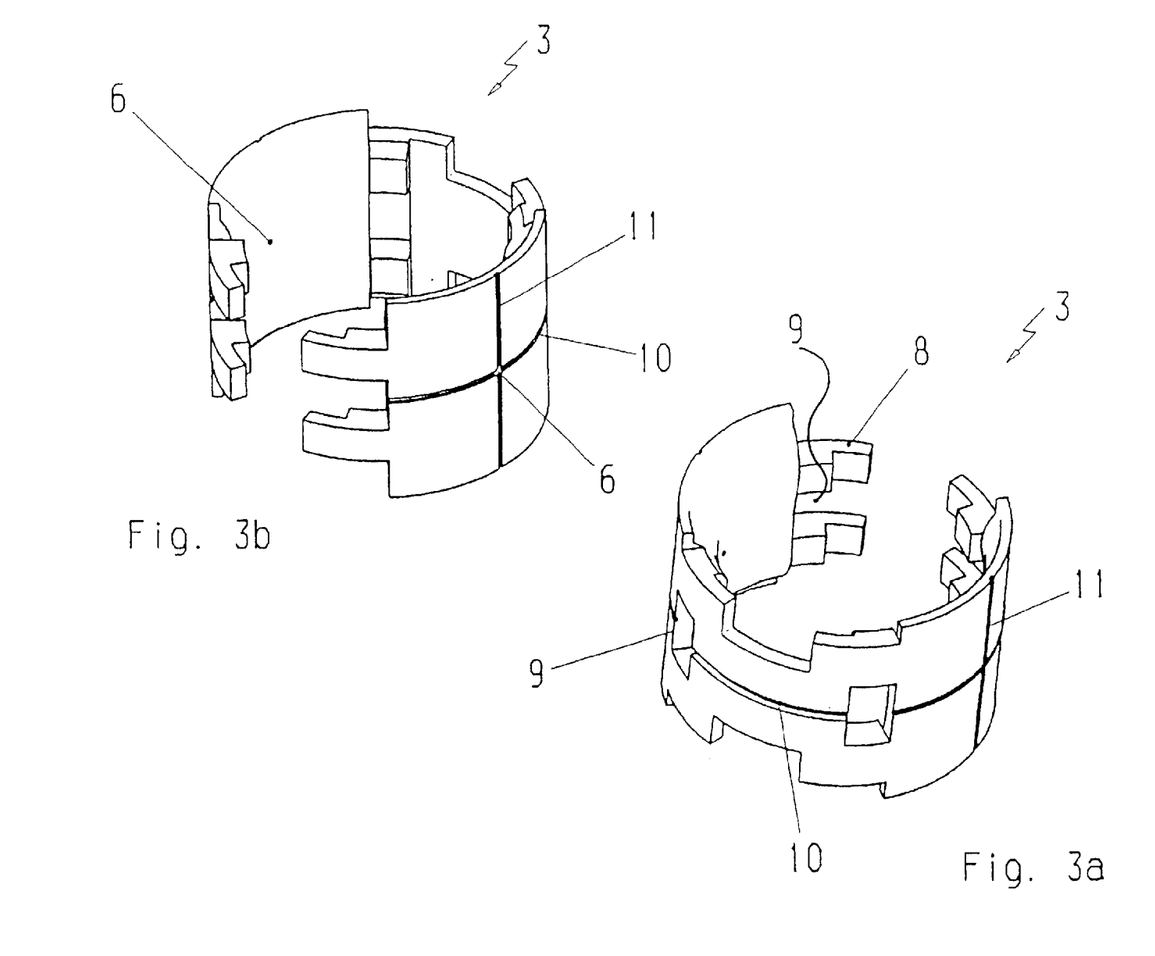
FIG. 3a is a three-dimensional view of the channel carrier.
FIG. 3b is the channel carrier according to FIG. 3a rotated by 180° around the axis of the bearing.

FIGS. 3a and 3b once again show the design of the channel carrier 3 in the form of a three-dimensional view. The recesses 9, which are arranged opposite the support elements 8 and are connected to one another by the damping agent channel 10, can be recognized in FIG. 3a. The damping agent channel 10 is extended in the example shown beyond the recesses 9. As a result, an additional mass damping is achieved as a consequence of the quenching effect due to the mass of the damping agent being distributed correspondingly in the channel. In addition, an additional damping is achieved in the area of the stop surfaces 4 for the radial travel limitation. The stop surfaces 4 of the channel carrier 3 are provided for this purpose with a small depression 5, in the middle of which a hole 6 is provided for the escape of the damping agent into the channel extended beyond the recesses 9 or into a transverse channel 11. FIG. 3b illustrates the design of the channel carrier 3 once again in a view rotated by 180°. The figure clearly shows the channel 11, which is provided in addition to the channel 10 arranged circularly around the axis of the bearing, the channel 11 extends in the axial direction. This transversely extending damping agent channel 11 intersects the channel 10 extending concentrically around the axis of the bearing precisely at the point at which the hole 6 is provided in the stop surface 4. As can be seen, the channel carrier 3 shown in the figure is made in one piece. It is mounted by slightly bending up the plastic part, which comes to lie around the rubber over an angle of about 300° after it has been pushed over the elastomer 2.

Figure 4A:
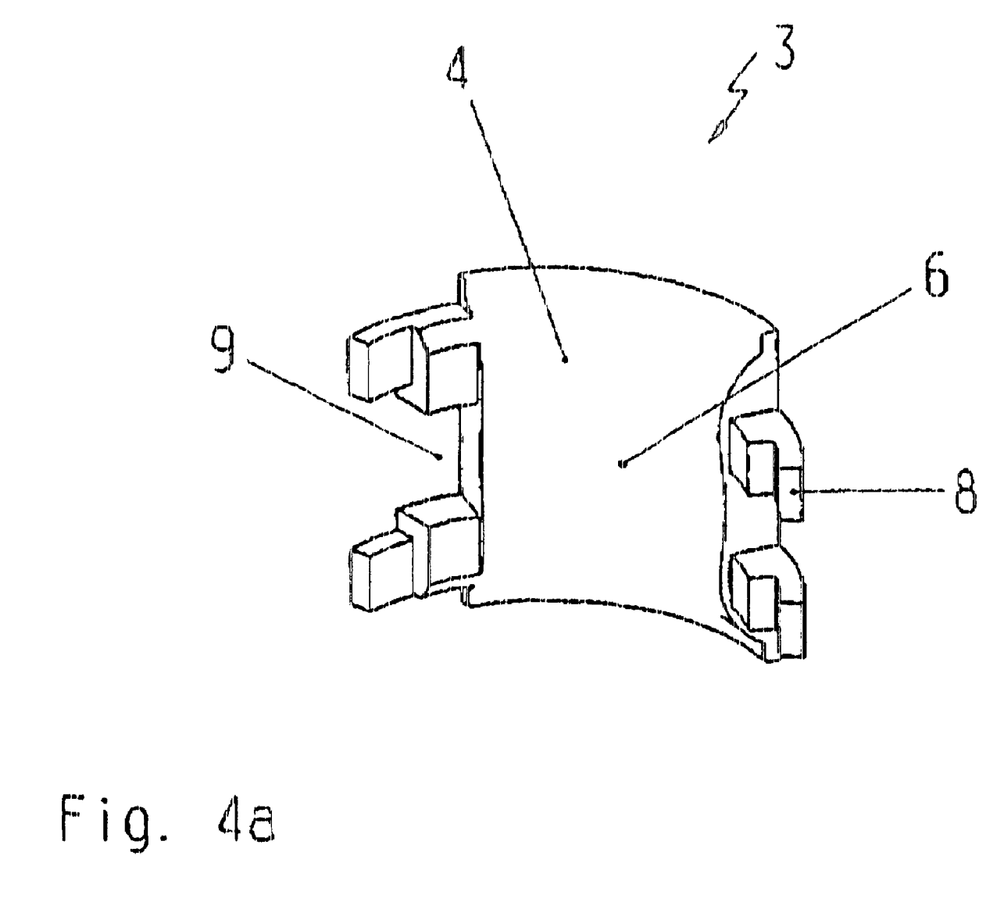
FIG. 4a is a three-dimensional view of a plastic part of a channel carrier formed by two plastic parts.
Figure 4B:
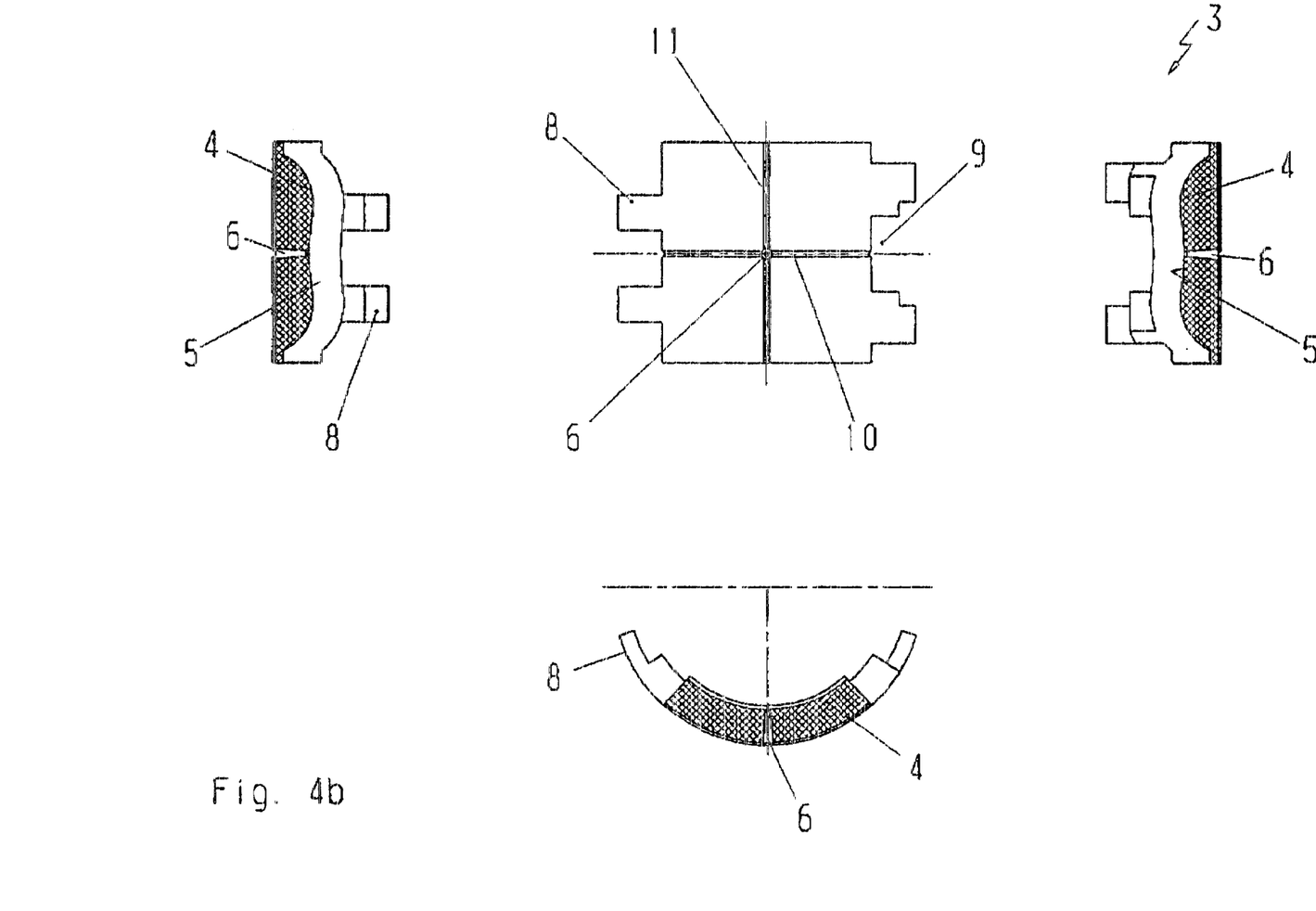
FIG. 4b is the plastic part according to FIG. 4a in a view on a developed surface.

Another conceivable design form is illustrated in FIGS. 4a and 4b. FIG. 4a shows one half of a channel carrier 3 made from two plastic parts. The second half of the channel carrier 3 has a comparable design and can be fixed against the second part by the shaping. FIG. 4b illustrates the part shown in FIG.4a as a developed surface in various views. The hole 6 provided in the area of the stop surfaces 4 is recognizable in all views. The hole 6 is advantageously arranged at the point of intersection between the circular channel 10 and the transverse channel 11 provided in addition thereto.

Figure 5:
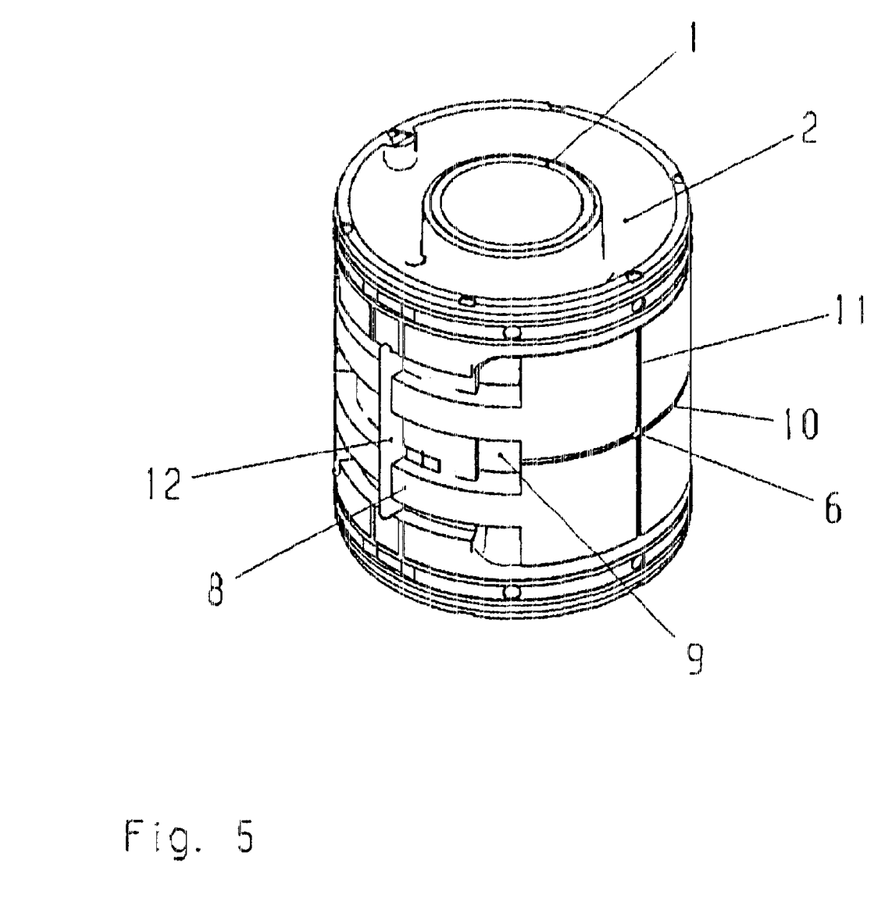
FIG. 5 is the entire bearing in a three-dimensional view with a valve.

FIG. 5 shows the three-dimensional view of a bearing designed according to the principle according to the present invention, in which an axially extending lip 12 is shaped on the elastomer 2 in the area of the support elements 8 to additionally influence the damping behavior. This rubber lip 12 acts as a valve integrated in the circular channel 10. The mobility of the lip 12 and consequently the opening behavior of the valve formed by it are determined, besides by the thickness of the lip 12, by the geometric design of the support elements 8 and their distance from the lip 12.

While specific embodiments of the invention have been shown and described in detail to illustrate the application of the principles of the invention, it will be understood that the invention may be embodied otherwise without departing from such principles.

What is claimed is:

1. A rubber bearing with radial travel limitation, the rubber bearing comprising:

an inner part with a tubular inner contour;

an elastomer surrounding the inner part and connected to said inner part by vulcanization;

a channel carrier, made of one or more plastic parts, said channel carrier surrounding the elastomer in some sections;

support elements supporting said channel carrier on the elastomer;

stop surfaces, for the radial travel limitation, provided on an inside of the channel carrier and, at least one damping agent channel integrated in the outer surface of the channel carrier connecting chambers formed between said elastomer and said channel carrier for receiving a liquid damping agent, in an area of said chambers, said channel carrier having recesses for the discharge and the entry of damping agent, said recesses being connected to one another by said damping agent channel, said recesses being arranged on a circumference of said channel carrier in an area of said support elements and also being arranged opposite these support elements, one of said channel carrier and said elastomer defining depressions enclosing the damping agent during the coming into contact of said elastomer with a corresponding one of said stop surfaces as a consequence of an inward deflection of the bearing brought about by a radially introduced force, said recesses being provided on an inner contour of said channel carrier and/or on the outer contour of said elastomer in an area of said stop surfaces;

holes for escape of the damping agent are provided in said channel carrier in the area of said depressions provided in said stop surfaces, wherein said recesses and said holes are arranged to provide circulation of the damping agent within a respective said chamber.

2. A rubber beating in accordance with claim 1, wherein said damping agent channel integrated in the outer surface of said channel carrier is extended beyond said recesses provided in the area of said chambers, so that damping due to liquid mass damping is ensured in addition to the viscous damping brought about by the circulation of the damping agent between said chambers, wherein said holes provided in said area of said depressions of said stop surfaces are arranged in said extended damping agent channel.

3. A rubber bearing in accordance with claim 1, wherein additional channels are integrated in the outer surface of said channel carrier, said additional channels extending at right angles to said damping agent channel and connecting said recesses and extending concentrically around the axis of the bearing and said holes provided in said areas of said depressions of said stop surfaces are arranged in said additional arranged channels.

4. A rubber in accordance with claim 1, wherein said elastomer has a lip extending in the axial direction and acts as a valve for the damping agent moving in said damping agent channel, wherein the mobility of said lip and consequently the opening behavior of the valve are determined by the geometric design of said support elements.

5. A rubber bearing in accordance with claim 1, wherein said channel carrier is designed as a one-part plastic part, which surrounds said elastomer connected to said inner part by approximately 300°, wherein said recesses provided opposite said support elements are provided as perforations in said channel carrier.

6. A rubber bearing with radial travel limitation, the rubber bearing comprising:

an inner part with a tubular inner contour;

an elastomer surrounding the inner part and connected to said inner part by vulcanization;

a channel carrier, made of one or more plastic parts, said channel carrier surrounding the elastomer in some sections;

support elements supporting said channel carrier on the elastomer;

stop surfaces for the radial travel limitation, provided on an inside of the channel carrier and, at least one damping agent channel integrated in the outer surface of the channel carrier connecting chambers formed between said elastomer and said channel carrier for receiving a liquid damping agent, in an area of said chambers, said channel carrier having recesses for the discharge and the entry of damping agent, said recesses being connected to one another by said damping agent channel, said recesses being arranged on a circumference of said channel carrier in an area of said support elements and opposite the same, one of said channel carrier and said elastomer defining depressions enclosing the damping agent during the coming into contact of said elastomer with a corresponding one of said stop surfaces as a consequence of an inward deflection of the bearing brought about by a radially introduced force, said recesses being provided on an inner contour of said channel carrier and/or on the outer contour of said elastomer in an area of said stop surfaces;

holes for escape of the damping agent are provided in said channel carrier in the area of said depressions provided in said stop surfaces;

additional channels integrated in the outer surface of said channel carrier, said additional channels extending at right angles to said damping agent channel and connecting said recesses and extending concentrically around the axis of the bearing and said holes provided in said areas of said depressions of said stop surfaces are arranged in said additional arranged channels.

7. A rubber bearing comprising:

an inner part with a tubular inner contour;

an elastomer surrounding said inner part and connected to said inner part by vulcanization;

a channel carrier arranged around the elastomer, said channel carrier and said elastomer defining a plurality of chambers, said channel carrier defining a damping channel communicating with said plurality of chambers;

one of an inside of said channel carrier and an outside of said elastomer defining a depression in said chambers, said depression being shaped to enclose a depression cavity in a respective said chamber when said inner part is moved with respect to said channel carrier;

said channel carrier defining recesses at each opposite circumferential end of each of said plurality of chambers, each of said recesses being in communication with each other through said damping channel.

8. A rubber bearing in accordance with claim 7, wherein:

said channel carrier defines a hole for said each chamber, each said hole communicating between a respective said chamber and a respective said depression cavity.

9. A rubber bearing in accordance with claim 8, wherein:
said damping channel is in direct communication with said hole in said channel carrier.

10. A rubber bearing in accordance with claim 8, wherein:
said damping channel extends circumferentially around said channel carrier;
said channel carrier defines another transverse channel extending axially along said channel carrier, said transverse channel being in communication with said damping channel.

11. A rubber bearing in accordance with claim 10, wherein:
said transverse channel intersects with said damping channel at said hole in said channel carrier.

12. A rubber bearing in accordance with claim 7, wherein:
said elastomer includes a lip extending into said damping channel, said lip is movable in said damping channel to vary a flow through said damping channel.

* * * * *